United States Patent
Chiang et al.

(10) Patent No.: US 7,782,924 B1
(45) Date of Patent: Aug. 24, 2010

(54) METHOD AND SYSTEM FOR WINDOWING

(75) Inventors: Johann Chiang, Austin, TX (US);
James L. Lansford, Austin, TX (US);
Kevin Shelby, Austin, TX (US)

(73) Assignee: Alereon, Inc., Austin, TX (US)

( * ) Notice: Subject to any disclaimer, the term of this patent is extended or adjusted under 35 U.S.C. 154(b) by 826 days.

(21) Appl. No.: 11/652,935

(22) Filed: Jan. 12, 2007

Related U.S. Application Data

(60) Provisional application No. 60/758,770, filed on Jan. 13, 2006.

(51) Int. Cl.
*H04B 1/00* (2006.01)
(52) U.S. Cl. .................................................... 375/130
(58) Field of Classification Search ......... 375/130–135, 375/138, 139, 140, 146, 296; 398/193; 455/114.3
See application file for complete search history.

(56) References Cited

U.S. PATENT DOCUMENTS

| | | | | |
|---|---|---|---|---|
| 5,796,760 A * | 8/1998 | Wiedeman et al. | .......... | 375/130 |
| 6,735,244 B1 * | 5/2004 | Hasegawa et al. | .......... | 375/219 |
| 7,027,418 B2 * | 4/2006 | Gan et al. | .......... | 370/329 |
| 7,295,509 B2 * | 11/2007 | Laroia et al. | .......... | 370/208 |
| 7,406,261 B2 * | 7/2008 | Shattil | .......... | 398/76 |
| 7,477,697 B2 * | 1/2009 | Pauli et al. | .......... | 375/267 |
| 2005/0238015 A1 * | 10/2005 | Jurgensen et al. | .......... | 370/389 |
| 2005/0259757 A1 * | 11/2005 | Wu et al. | .......... | 375/260 |
| 2006/0062196 A1 * | 3/2006 | Cai et al. | .......... | 370/345 |

* cited by examiner

*Primary Examiner*—Sam K Ahn
(74) *Attorney, Agent, or Firm*—Sprinkle IP Law Group

(57) ABSTRACT

Embodiments of the present invention provide a system and method for reducing the power of a UWB signal over a desired range of frequencies. Embodiments of the present invention reduce power over the desired range of frequencies by reducing the sidelobe power of tones comprising the UWB signal. Embodiments of the present invention reduce sidelobe power by applying a particular windowing function to the UWB signal.

28 Claims, 6 Drawing Sheets

Cyclic Suffixing

Cyclic Suffixed Signal after Windowing

Over-lap Add Procedure

METHOD AND SYSTEM FOR WINDOWING

RELATED APPLICATIONS

This application claims priority to U.S. Provisional Patent Application Ser. No. 60/758,770 by inventors Johann Chiang, et al., entitled "Method and System for Windowing" filed on Jan. 13, 2006, the entire contents of which are hereby expressly incorporated by reference for all purposes.

TECHNICAL FIELD OF THE INVENTION

The invention relates in general to methods, systems and apparatuses for shaping the energy spectrum of a UWB signal. More particularly, the invention relates to methods, systems and apparatuses for shaping an energy spectrum of a UWB signal through the notching of the energy spectrum of the UWB signal. Even more particularly, the invention relates to increasing the depth of notches in an energy spectrum by decreasing or minimizing sidelobe contributions using windowing techniques.

BACKGROUND

Recently, wireless data, entertainment and mobile communications technologies have become increasingly prevalent, particularly in the household environment. The convergence of these wireless data, entertainment and mobile communications within the home and elsewhere has created the need for merging many disparate devices into a single wireless network architecture capable of seamlessly supporting and integrating the requirements of all of these devices. Seamless connectivity and rapid transfer of data, without confusing cables and wires for various interfaces that will not and cannot talk to each other, is a compelling proposition for a broad market.

To that end, communication industry consortia such as the MultiBand OFDM Alliance (MBOA), Digital Living Network Alliance (DLNA) and the WiMedia Alliance are establishing design guidelines and standards to ensure interoperability of these wireless devices. The WiMedia Alliance has promulgated such a guideline and standard, hereinafter referred to as the WiMedia Specification.

Although it began as a military application dating from the 1960s, UWB has recently been utilized as a high data rate (480+ Mbps), short-range (up to 20 meters) technology that is well suited to emerging applications in the consumer electronics, personal computing and mobile markets. When compared to other existing and nascent technologies capable wireless connectivity, the performance benefits of UWB are compelling. For example, transferring a 1 Gbyte file full of vacation pictures from a digital camera to a computer take merely seconds with UWB compared to hours using other currently available, technologies (i.e. Bluetooth) and consume far less battery power in doing so.

In typical UWB, data is transmitted using a plurality of signals, the plurality of signals are transmitted using a plurality of frequencies within a UWB frequency range. The signal transmitted at any one frequency is referred to as a tone. Thus, a typical UWB signal is comprised of a plurality of tones, each tone associated with a particular frequency.

Because UWB, by definition, is spread over a broad spectral range, the power spectral density of a signal utilized by a UWB device is usually very low, and hence, usually results in low incidence of interference with other systems which may be utilizing the same bandwidth as the UWB device or system.

Power spectral density, however, may be a function of distance. Consequently, if a UWB device is in close proximity to another wireless system, the potential for interference between the UWB device and the wireless system cannot be neglected.

Additionally, there may be select frequency bands within a UWB channel where it is necessary to explicitly suppress emissions. For example, some existing UWB spectrum allocations encompass frequencies used by C-Band satellite downlinks. Thus, it may be necessary in certain regulatory domains for UWB systems to defer to these and other types of systems.

Thus, the ability to control the shape and energy of a UWB signal is important for many reasons, including regulatory, commercial and interference. Therefore, there is a need to develop methods and techniques for controlling or shaping the power spectrum of a UWB signal or waveform.

SUMMARY OF THE INVENTION

One or more of the problems outlined above may be solved by the various embodiments of the invention.

Broadly speaking, embodiments of the invention comprise methods and systems for controlling or shaping the power spectrum of a UWB signal or waveform, in particular, embodiments of the invention regard methods or systems for reducing UWB signal power over a desired range of frequencies. In some embodiments, a windowing function is utilized in conjunction with cyclic suffixing techniques to reduce sidelobes in a transmitted UWB signal. The windowing function may be chosen such that when an overlap-add technique is applied, the windowing can be substantially undone and the waveform substantially reconstructed at a receiver. In particular, in one embodiment, to create a cyclic suffix, a certain number of samples of a signal are duplicated and appended to the signal such that the signal comprises the original signal and the appended suffix. A particular windowing function may be applied to the signal such that when an overlap-add is performed at a receiver, the original waveform may be substantially reconstructed.

One embodiment of the present invention is a method for shaping the power spectrum of a UWB signal, comprising: at a transmitter: copying a portion having a length from the UWB signal, appending the portion to the UWB signal and applying a windowing function to the UWB signal, wherein the windowing function is selected such that applying an overlap-add function to the windowed UWB signal will substantially undo the effects of the windowing function.

The above method may further comprise: at a receiver: receiving the windowed UWB signal and applying an overlap-add function to the windowed UWB signal such that the effects of the windowing function are substantially undone.

In some embodiments, the windowing function or the length of the cyclic suffix may be chosen based upon desired properties of the waveform in the frequency domain. For example, the windowing function or the length of the cyclic suffix can be chosen so as to minimize the power in sidelobes. The choice of a particular windowing function or length of the cyclic suffix may depend on a number of factors including the desired signal power in a desired frequency range. The windowing function or number of samples in the cyclic suffix may affect the ability to recapture the energy of the waveform, the suppression of sidelobes, the maintenance of the width of the mainlobe, etc.

Embodiments of the present invention provide the advantage that when combined with tone nulling signal power over a desired range of frequencies is reduced. Embodiments of the present invention provide the additional advantage that the reduction of signal power can be more effective relative to other methods of reducing signal power. Embodiment of the present invention provide further advantages in that the present invention is straight-forward to implement and can be accomplished in the time domain. An additional advantage of embodiments of the present invention is that windowing can be applied to the preamble and payload of a signal equally. Embodiments of the present invention provide the added benefit of accelerating rolloff at band edges, thus reducing out of band emissions.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF FIGURES

A more complete understanding of the present invention and the advantages thereof may be acquired by referring to the following description, taken in conjunction with the accompanying drawings in which like reference numbers indicate like features and wherein.

DETAILED DESCRIPTION

Figure 1:
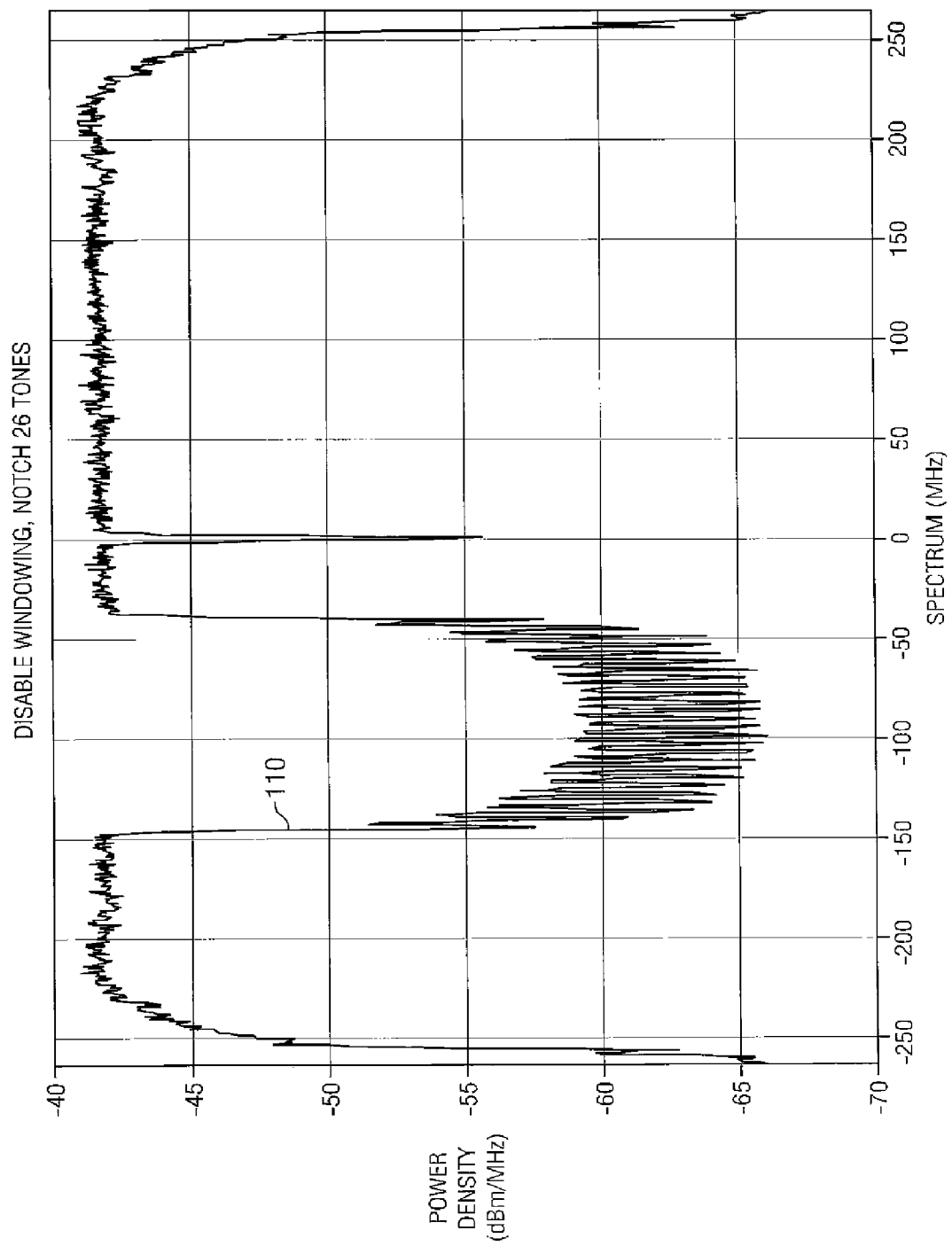
FIG. 1 is a graphical representation of notching the power spectrum of a UWB signal.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

The WiMedia Alliance has developed a standard platform for wireless communication using Ultra-Wideband (UWB) technology. The requirements of this platform are delineated in the WiMedia specification. While providing a standard basis for wireless communication using UWB technology, the WiMedia specification promulgated by the WiMedia Alliance is being continually developed by members of the Alliance to incorporate innovations which enhance the usefulness and functionality of WiMedia UWB wireless communication systems.

To this end, members of the Alliance are enhancing the functionality of WiMedia UWB wireless technology by developing methods which allow WiMedia UWB wireless systems to avoid interfering with radio systems which use frequencies in or near the broad swath of frequencies which lie within the frequency range used by UWB wireless systems. WiMedia UWB wireless technology is also being enhanced by the development of signal detect and avoidance: WiMedia UWB wireless radio functionality has been developed which enables WiMedia UWB wireless radio systems to detect signals and noise. If signals or noise is detected, a WiMedia UWB wireless system can then avoid using the frequencies upon which the signals or noise was detected. The purpose of this functionality is to enable WiMedia UWB wireless radio systems to operate without interfering with other wireless systems and to avoid frequencies plagued by noise. While signal detection and avoidance has been discussed with regard to WiMedia UWB wireless systems, it is to be understood that signal detection and avoidance can be used in other communication systems with similar results.

Embodiments of the invention encompass systems, methods and techniques for suppressing or reducing signal power over a desired range of frequencies. These methods and techniques can be used to reduce the interference between a UWB signal and other signals in a particular frequency range. It may be possible for such UWB systems to dynamically determine frequencies in the frequency range over which a UWB signal is transmitted on which there are noise or signals. The UWB system can then null tones at specific frequencies, so as to notch (i.e. suppress or reduce) the power of a transmitted UWB signal over specifically chosen frequency ranges to avoid interfering with the known or detected radio systems and noise.

An example of one embodiment of notching the UWB signal power through nulling is shown in FIG. 1. In FIG. 1, trace 110 shows how nulling tones has produced a notch in the power spectrum from approximately −151 MHz to −48 MHz. As shown by trace 110, in a frequency range spanning approximately 51 MHz (e.g. from approximately −151 MHz to −48 MHz), the power has been reduced from over −43 dBm to less than −60 dBm at some frequencies—a drop of approximately 23 dBm.

Nulling tones can be done dynamically, in response to signal or noise measurements, or the tone nulling can be applied to a fixed range of frequencies, or a combination of fixed tone nulls and dynamic tone nulling can be used. Thus it is possible for a UWB system to avoid detected signals and noise and to avoid interfering with frequencies known to be used by other radio systems.

Mere tone nulling alone, however, may not completely or adequately eliminate signal power over the desired frequency range, because in many UWB implementations, generating a tone produces sidelobes with an associated signal power at frequencies different from the frequency of the generated tone. As a result, sidelobes generated by producing tones may bleed-over into, or resonate within, the UWB frequency range over which it is desirable to reduce power.

The effects of this are shown by trace 110 of FIG. 1 which represents notching the power spectrum of a UWB signal: despite nulling tones, signal power still exists within the notched range of frequencies. For example, in FIG. 1, at approximately 100 MHz, trace 110 exhibits a power level exceeding −60 dBm. This is due in part to the signal power of sidelobes bleeding-over or resonating within the nulled tone frequencies. As graphically shown by trace 110, this has the effect of diminishing the interference-avoiding effects of tone nulling because the signal power of the sidelobes resonating in the frequency range of the notch (e.g. from approximately −151 MHz to −48 MHz) has the potential to interfere with other radio system signals in the frequency range over which it is desired to create a notch.

Figure 2:
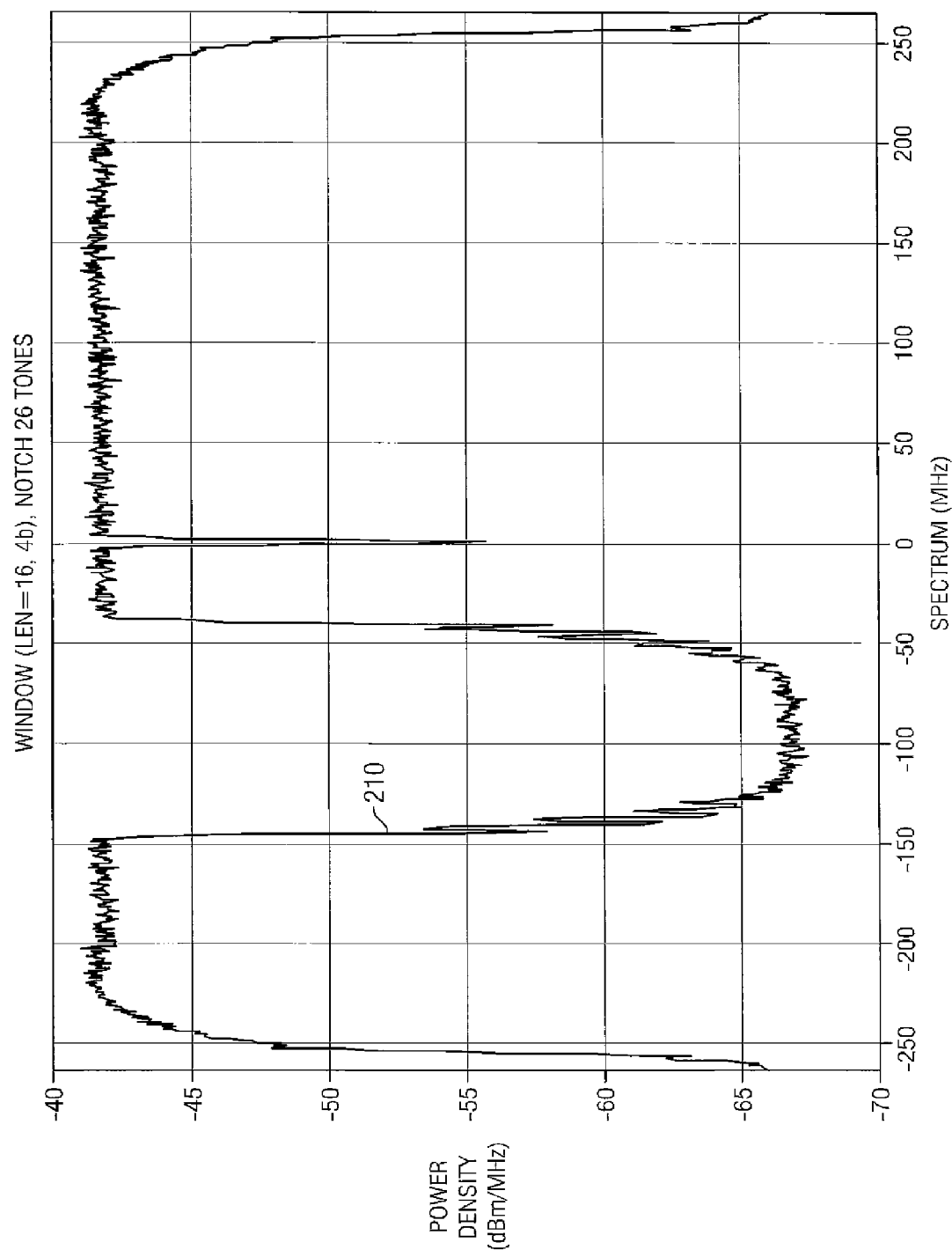
FIG. 2 is a graphical representation of a notch created in power spectrum of a UWB signal using one embodiment of windowing in conjunction with a cyclic suffix of length 16.

Because of the deleterious effects that sidelobes may have on notch depth, it may be helpful to cancel out, or reduce, the sidelobes of one or more tones in order that signal power in a certain frequency range may be further suppressed, or interference between adjacent tones reduced. Sidelobe reduction can have the effect of further reducing signal power in a notch relative to tone nulling alone, thus deepening the depth of the notch. This effect is shown by trace 210 of FIG. 2: because of sidelobe reduction, the power level in the frequency range of the notch (e.g. from approximately −151 MHz to −48 MHz) has been reduced to below −65 dBm. Increasing notch depth reduces the likelihood that the UWB signal will interfere with radio systems operating on frequencies substantially within the notch. Increasing notch depth may also be necessary to comport with regulatory requirements. For example, to ensure that WiMedia UWB wireless systems adhere to the regulatory requirements of various countries and do not interfere with the operability of pre-existing radio systems, it may be desirable to use notching in conjunction with sidelobe suppression/reduction techniques to increase notch depth.

Windowing is one technique that can be used to reduce sidelobe leakage. Windowing is a signal processing technique used for manipulating the power spectrum of a signal, in which a signal is forced to substantially zero in areas by applying a windowing function to portions of the waveform. The effect of the application of a window to a UWB signal is to accentuate a particular tone and/or reduce the sidelobes of that tone. This is especially apparent in the frequency domain.

Figure 3:
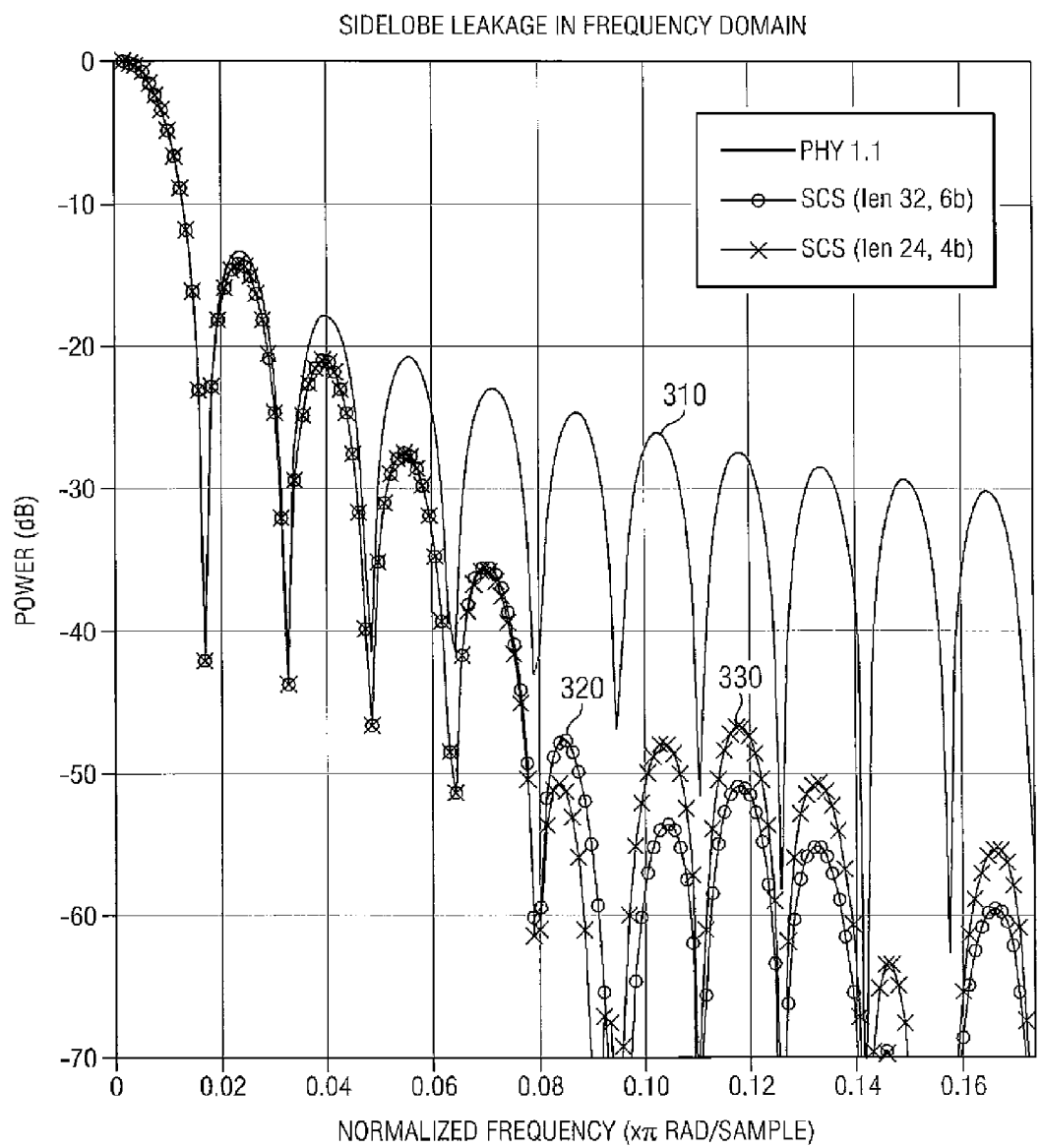
FIG. 3 is a graphical representation in the frequency domain of the effects of using one embodiment of windowing to reduce sidelobes of a tone.

The sidelobe reduction effects of windowing in the frequency domain are shown in FIG. 3: trace 310 is an unwindowed signal, while traces 320 and 330 are of a windowed signal. As is apparent from a comparison of trace 310 and traces 320 and 330, the application of a window has appreciably reduced sidelobe power. The traces of windowed signals—i.e. traces 320 and 330—fall off towards zero appreciably faster than unwindowed signal trace 310. Thus, by using windowing to reduce sidelobes, the effect of these sidelobes on adjacent tones may be similarly reduced and/or emissions in adjacent frequencies may be better controlled, resulting in greater notch depth and less potential interference relative to tone nulling alone.

The rapid decline of sidelobe power towards zero can be one factor in helping to reduce sidelobe interference because not only is the power of the sidelobes resonating in the notch reduced, but the number of tones having sidelobes which materially affect the power levels in a notch is also reduced, thereby reducing the number of tones which have the potential to interfere with other signals in the notched range of frequencies. Another benefit of the rapid decline of sidelobe power towards zero is the reduction in the number of tones that can materially interfere with the mainlobe of any one tone because the frequency range over which the sidelobes of any one tone can materially affect the mainlobe of another tone is diminished, thus reducing the total number of tones that have the potential to materially interfere with any one tone. The use of a particular windowing function may affect the speed and manner in which the sidelobes decline towards zero. Windowing may also accelerate rolloff at band edges, thus reducing out of band emissions.

A potential problem with windowing, however, is that it may distort a signal in a manner which causes data to be lost at a receiver. The signal distortion effects of windowing may be difficult to undo at a receiver, resulting in a loss of data. It is therefore desirable to minimize the distortive effects of windowing which may interfere with data recovery at the receiver and to undo windowing distortion to get back pre-windowing signal energy. The windowing effects, distortion and the complexity of techniques for undoing them, however, depend in part on the windowing function and how it is applied.

Rectangular windowing functions may have favorable properties in the time domain but exhibit adverse effects in the frequency domain. These effects may be difficult to undo at a receiver. Thus, it is desirable to have a windowing technique which reduces sidelobe contributions but which allows the effects of windowing to be minimized or readily undone at a receiver. Additionally, it may be desired that these windowing techniques have minimal impact on the width of the mainlobe and energy capture performance at a receiver.

Embodiments of systems and methods of the present invention provide windowing techniques which accomplish those goals. More particularly, embodiments of the present invention may provide windowing techniques which allow the suppression of sidelobes while substantially maintaining the width of the mainlobe. These techniques may be used to ensure that transmitted data can be substantially recovered from a windowed UWB signal. Specifically, in one embodiment, using a technique known as cyclic suffixing in conjunction with windowing at a transmitter reduces sidelobe contributions to a UWB signal, thus reducing UWB signal power in a range of frequencies, while allowing for the effects of the windowing to be minimized or undone at a receiver through the use of a technique known as overlap-add.

Cyclic-suffixing is a technique in which a portion having a length is copied from the start of a signal (or a portion thereof) and appended to the end of the signal (or the end of the signal portion). The portion of the signal that is copied is referred to as the prefix, the appended copy of the prefix portion is referred to as the suffix. Embodiments of the invention that utilize cyclic suffixing can easily be used with the WiMedia Specification because the WiMedia Specification currently has provision for a 32 zero guard suffix. This guard suffix is used to ensure orthogonality between UWB signals, capture multipath ringdown and ensure that a UWB signal has a length that is at least the length of the longest period or cycle of the frequencies comprising it. Instead of being used for a 32 zero guard suffix, the space reserved for the guard suffix can be used to implement cyclic suffixing.

Figure 4A:
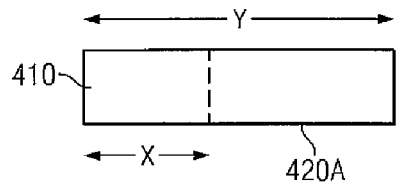
FIGS. 4A-4B are representations of one embodiment of cyclic suffixing techniques and methods.
Figure 4B:
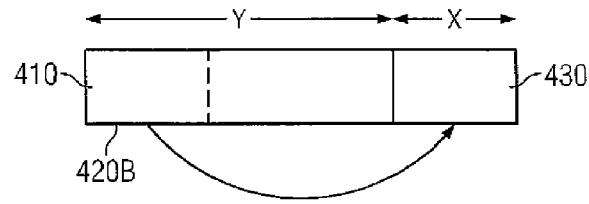

An illustration of one embodiment of cyclic suffixing is shown in FIGS. 4A-4B. In FIG. 4A, signal 420A having length Y includes a (prefix) portion 410 of length X. In FIG. 4B, prefix portion 410 is copied and appended as suffix 430 on the end of original signal 420A to create signal 420B. As shown in FIG. 4B, the length of the combination of original signal 420A and appended suffix 430 is Y+X. Thus signal 420B comprises original signal 420A and suffix 430: as such, signal 420B has a length of Y+X.

In one embodiment of the invention, the concatenation of the UWB signal and the suffix has a duration that encompasses at least one complete frequency period or cycle of all tones comprising the UWB signal. In another embodiment, the concatenation of the UWB signal and the suffix has a duration that is substantially an integer multiple of a period or cycle of all the frequencies of the tones comprising the UWB signal.

In some embodiments of the present invention, it may be important to have a UWB signal or a portion of a UWB signal with a duration equal to, or at least as long as, an integer multiple of a period or cycle of all the frequencies of the tones comprising the UWB signal to ensure orthogonality between tones or UWB signals and to facilitate circular convolution of a UWB signal or UWB signal portion (circular convolution may be applied at a receiver). This duration may also be important because it can be utilized in conjunction with an overlap-add step at the receiver to ensure the recovery of complementary energy from a section of a UWB signal or portion of a UWB signal affected by windowing, thus minimizing or substantially undoing the effects of a windowing operation on a signal or portion of a signal.

Overlap-add may be utilized to enhance the energy capture of a tone. Overlap-add is a technique wherein samples from a portion of a signal are copied or removed and overlapped and applied to (i.e. through addition, multiplication or convolution) a different portion of the signal.

Figure 4C:
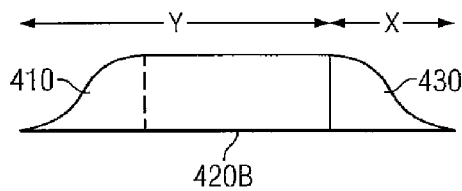
FIG. 4C is a representation of one embodiment of windowing effects.
Figure 4D:
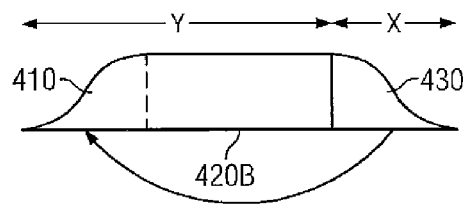
FIGS. 4D-4E are representations of one embodiment of overlap-adding techniques and methods.
Figure 4E:
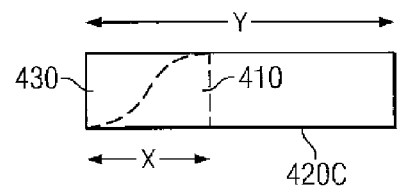

Overlap-add may be utilized in conjunction with a windowing function such that the application of the overlap-add to a signal to which a particular windowing function has been applied will substantially reverse at least some of the effects of the windowing technique. FIG. 4C shows a cyclic suffixed signal after a windowing function has been applied. As can be seen from FIG. 4C, both prefix 410 and suffix 430 of signal 420B have been affected by the windowing function. In one embodiment, the overlap-add technique is applied as follows: the suffix is copied or removed, overlapped with, and added or otherwise applied to, the prefix. FIGS. 4D and 4E illustrate this technique: suffix 430 is duplicated or removed and overlaid and added to prefix 410. As shown in FIG. 4E, this results in the substantial reconstruction of the signal power of prefix 410, thus substantially undoing windowing effects or distortion. As further shown by FIG. 4E, if suffix 430 is removed and added to prefix 410, the length of signal 420C is Y. Thus, in this embodiment, the length of signal 420C is equal to or substantially equal to the length of original signal 420A. In some embodiments, it could be possible to copy or remove the prefix and overlap-add it to the suffix to achieve a result similar to that described above.

When used in conjunction with cyclic suffixing, overlap-add can be used to minimize the effects of windowing or allow for the substantial reconstruction of a UWB signal, thereby undoing the effects of the windowing. In other words, the overlap-add technique may be leveraged to substantially undo a windowing process. In some embodiments of the invention, cyclic suffixing, windowing, and overlap-add techniques and methods are implemented in logic or circuitry.

Figure 5:
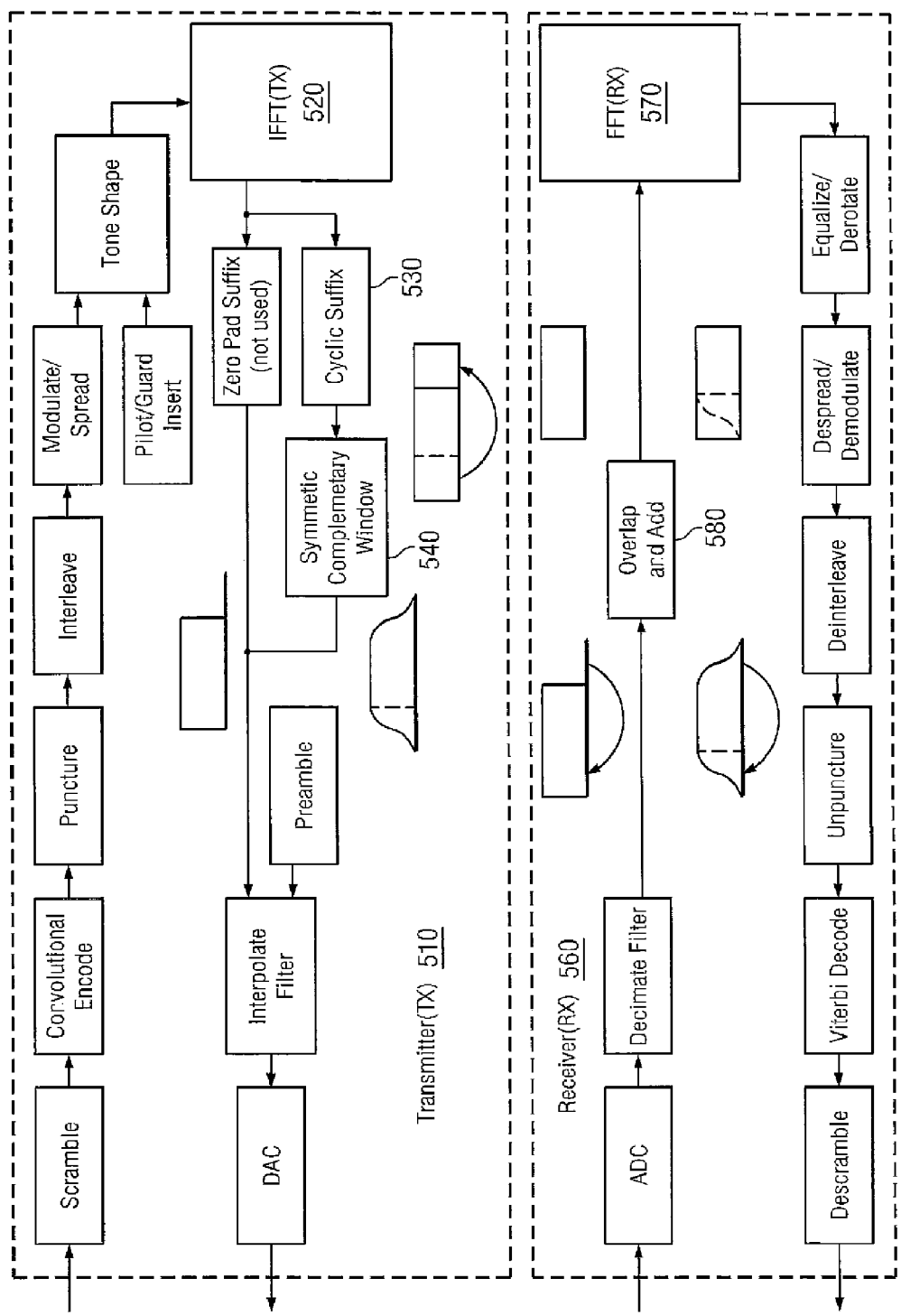
FIG. 5 is a block diagram of one embodiment of a UWB system for reducing sidelobes of a signal.

FIG. 5 shows a block diagram of an embodiment of the present invention. At the output of Inverse Fast Fourier transform (IFFT) 520 in Transmitter 510, a time domain UWB signal is cyclic suffixed at logic block 530 by copying a prefix of the UWB signal and appending the prefix to the end of the UWB signal as a suffix. A window is then applied (at logic block 540) to the combination of the UWB signal and the suffix, such that the UWB prefix and suffix are modified by the windowing function. The windowed UWB signal is then transmitted.

Following transmission by Transmitter 510, the windowed UWB signal is received at Receiver 560. Prior to a Fast Fourier Transform (FFT) procedure (logic block 570), an overlap-add function is applied to the UWB signal in the time domain by logic block 580. In one embodiment, the suffix is copied, overlaid with and added to the prefix.

A windowing function can be selected for application at logic block 540 of FIG. 5 which aids in the reconstruction of signal data from a signal transmitted by Transmitter 510 by helping to minimize or substantially undo the effects of the windowing procedure when an overlap-add procedure is applied at logic block 580. For example, the windowing functions used could be complementary functions, symmetric functions, functions which are both complementary and symmetric or functions which are neither complementary or symmetric. A symmetric windowing function is a function which has portions which are generally symmetric about the Y axis. A complementary function is a function which has portions such that when the portions are overlapped and added, the portions sum substantially to unity. The use of specially chosen or constructed windowing functions which are substantially complementary and/or symmetric enables signal recovery through the use of overlap-add at logic block 580.

Generally, the use of a symmetric windowing function at logic block 540 may result in better sidelobe suppression and deeper notch depth of a signal transmitted from Transmitter 510, while the use of a complementary function may increase the effectiveness of the application of an overlap-add function and signal recovery at Receiver 560 relative to other windowing functions. A particular windowing function may substantially enable undoing the effects of windowing if the overlapped window sections sum substantially to unity. In one embodiment, in order to maximize signal recovery, the windowing function can be selected to substantially maximize the energy under the windowing function, allowing the recovery or reconstruction of complementary energy during overlap-add at logic block 580. In one embodiment of the present invention, the set of functions which may be used to construct a windowing function to be used in conjunction with cyclic suffixing and overlap-add techniques include tan h, $\cos^2$, $\sin^2$ or $1-\sin^2$.

Embodiments of the present invention may use cyclic suffixes of different lengths. The number of samples of the cyclic suffix may be chosen according to a particular application, or other criteria, to achieve a desired balance between sidelobe suppression and energy capture performance at Receiver 560. Suppression of sidelobes may affect the energy capture performance of a receiver. Thus, a desirable cyclic suffix size may be chosen based upon the application of the particular wireless UWB system in which embodiments of the above described invention may be utilized.

For example, in a line of sight application in which the direct path signal can be captured with relative ease, and thus adequate energy capture is not dependent on any multipath signals, 32 samples may be utilized for better sidelobe suppression. However, in an application in which there may not be a line of sight, using 32 samples may degrade the multipath performance to unacceptable levels. In this case, it may be desirable to use 16 samples. In some applications or embodiments, the cyclic suffix length may be substantially continuously varied during operation of Transmitter 510 based on a whole host of criteria such as signal strength, perceived interference, and multipath signal detection, among others. For example, the cyclic suffix may comprise 8 samples, 16 samples, 32 samples, etc.

Figure 6:
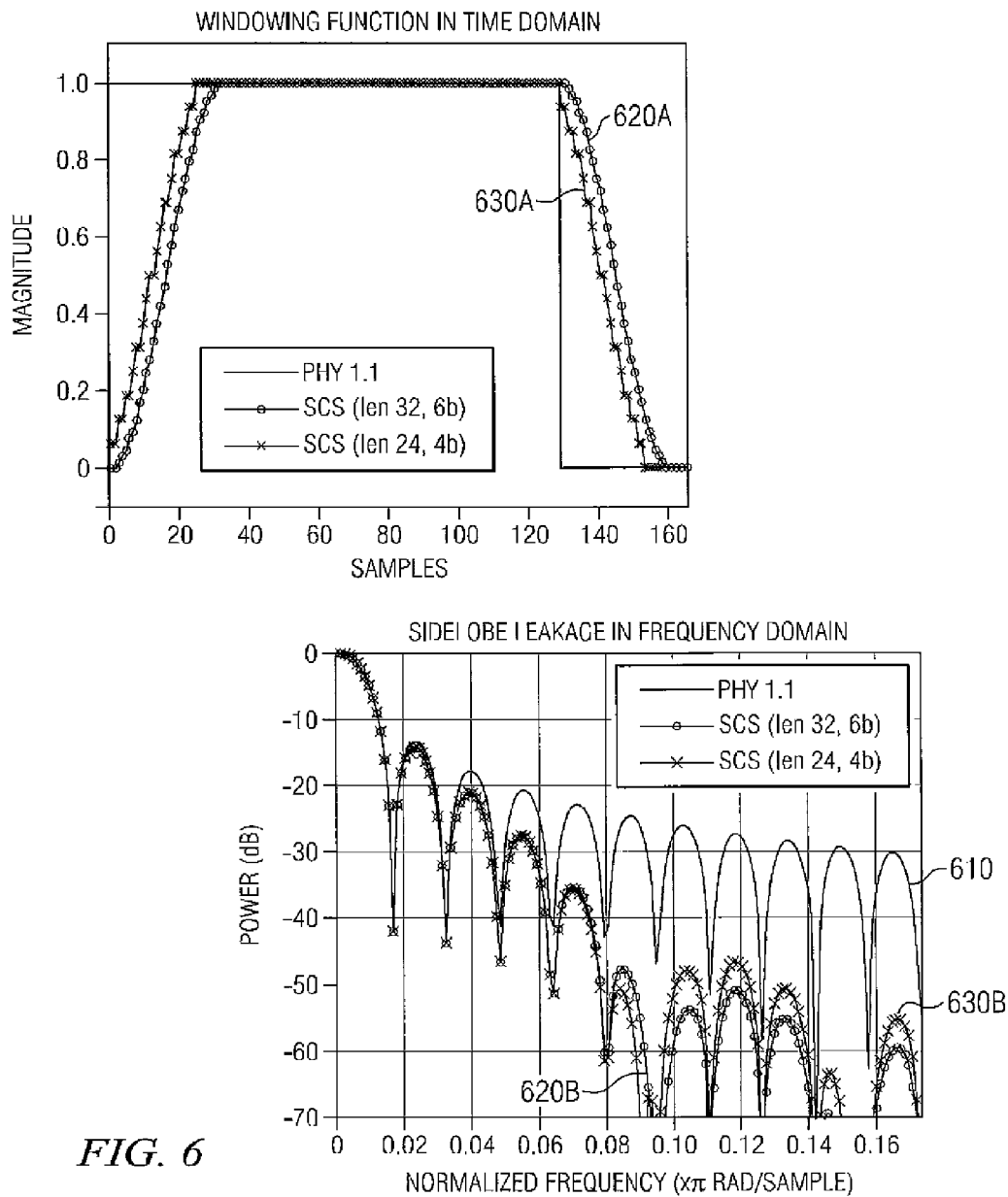
FIG. 6 is a diagrammatic representation of one embodiment of a windowing function for use with an embodiment of the present invention and its time and frequency domain effects.

FIG. 6 illustrates the time domain and frequency domain effects of using a windowing function constructed using $\sin^2$ in conjunction with cyclic suffixes of different lengths. Traces 630A and 630B represent the utilization of a cyclic suffix having a length of 24 samples. Traces 620A and 620B represent the utilization of a cyclic suffix having a length of 32 samples. Trace 610 is the trace of sidelobes of an unwindowed signal. It will be noted with reference to trace 610 and traces 620B and 630B that no matter whether the cyclic suffix comprises either 24 or 32 samples, all other things being substantially equal, a significant degree of sidelobe suppression relative to an unwindowed signal may be achieved. In fact, in some cases better than a 10 dB increase in sidelobe suppression may be achieved. Additionally, note that the width of the mainlobe has not changed (i.e. grown in width), or the change in width of the mainlobe is substantially insignificant, when a cyclic suffix of either 24 or 32 samples is used.

In the foregoing, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. For example, though the above embodiments have been described with respect to UWB radio, it will be apparent that the same systems and methods will apply equally well to other frequency ranges and other types of radios and transmission and reception techniques.

Embodiments of the invention disclosed herein can be implemented by programming one or more computer systems (e.g., microcontrollers, digital signal processors, etc.) and devices (e.g., Programmable Read Only Memory (PROM), Random Access Memory (RAM), etc.) with computer-executable instructions embodied in a computer-readable medium. When executed by a processor, these instructions operate to cause these computer systems and devices to perform one or more functions particular to embodiments of the invention disclosed herein (e.g., generate and apply a windowing function, perform an overlap-add operation, etc.). Programming techniques, computer languages, devices, and computer-readable media necessary to accomplish this are known in the art and thus will not be further described herein.

Embodiments of the invention and components of the invention disclosed herein can be implemented in hardware.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for shaping power spectrum of a Ultra-Wideband (UWB) signal, comprising:
   at a transmitter:
   copying a portion having a length from the Ultra-Wideband (UWB) signal;
   appending the portion to the UWB signal; and
   applying a windowing function to the UWB signal, wherein the windowing function is selected such that applying an overlap-add function to the windowed UWB signal will substantially undo the effects of the windowing function.

2. The method of claim 1, wherein the windowing function is symmetric.

3. The method of claim 1, wherein the windowing function is complementary.

4. The method of claim 1, wherein the windowing function comprises one of: tan h, cos 2, sin 2 or 1−sin 2.

5. The method of claim 1, wherein the length of the portion is 32 samples.

6. The method of claim 1, wherein the length of the portion can be dynamically varied.

7. The method of claim 1, wherein the windowing function can be dynamically varied.

8. The method of claim 1, wherein the windowed UWB signal has a duration that is an integer multiple of a period or cycle of all the frequencies of the tones comprising the UWB signal.

9. The method of claim 1, further comprising transmitting the windowed UWB signal using the transmitter.

10. The method of claim 9, further comprising:
    at a receiver:
    receiving the windowed UWB signal; and
    applying an overlap-add function to the windowed UWB signal such that the effects of the windowing function are substantially undone.

11. A system capable of shaping the power spectrum of a Ultra-Wideband (UWB) signal, comprising:
    a transmitter, the transmitter comprising:
    a cyclic suffix logical block configured to:
    copy a portion having a length from the Ultra-Wideband (UWB), signal, and
    append the portion to the UWB signal; and
    a windowing logical block configured to:
    apply a windowing function to the UWB signal, wherein the windowing function is selected such that applying an overlap-add function to the windowed UWB signal will substantially undo the effects of the windowing function.

12. The system of claim 11, wherein the windowing function is symmetric.

13. The system of claim 11, wherein the windowing function is complementary.

14. The system of claim 11, wherein the windowing function comprises one of: tan h, cos 2, sin 2 or 1−sin 2.

15. The system of claim 11, wherein the length of the portion is 32 samples.

16. The system of claim 11, wherein the length of the portion can be dynamically varied.

17. The system of claim 11, wherein the windowing function can be dynamically varied.

18. The system of claim 11, wherein the windowed UWB signal has a duration that is an integer multiple of a period or cycle of all the frequencies of the tones comprising the UWB signal.

19. The system of claim 11, wherein the transmitter is further configured to transmit the windowed UWB signal.

20. The system of claim 19, further comprising:
    a receiver configured to
    receive the windowed UWB signal
    the receiver comprising an overlap and add logical block configured to
    apply an overlap-add function to the windowed UWB signal such that the effects of the windowing function are substantially undone.

21. A non-transitory computer readable medium comprising a set of computer instructions, said set of computer instructions executable to:
    copy a portion having a length from a Ultra-Wideband (UWB) signal;
    append the portion to the UWB signal; and
    apply a windowing function to the UWB signal, wherein the windowing function is selected such that applying an overlap-add function to the windowed UWB signal will substantially undo the effects of the windowing function.

22. The computer readable medium of claim 21, wherein the windowing function is symmetric.

23. The computer readable medium of claim 21, wherein the windowing function is complementary.

24. The computer readable medium of claim 21, wherein the windowing function comprises one of: tan h, cos 2, sin 2 or 1−sin 2.

25. The computer readable medium of claim 21, wherein the length of the portion is 32 samples.

26. The computer readable medium of claim 21, wherein the length of the portion can be dynamically varied.

27. The computer readable medium of claim 21, wherein the windowing function can be dynamically varied.

28. The computer readable medium of claim 21, wherein the windowed UWB signal has a duration that is an integer multiple of a period or cycle of all the frequencies of the tones comprising the UWB signal.

* * * * *